United States Patent
Groover et al.

(10) Patent No.: US 10,710,491 B1
(45) Date of Patent: Jul. 14, 2020

(54) OUTDOOR KITCHEN (71) Applicant: Grand Design RV, LLC, Middlebury, IN (US)

(72) Inventors: Robert Groover, Middlebury, IN (US); Nathan Goldenberg, Middlebury, IN (US); Jeff Christner, Middlebury, IN (US); Glenn Miller, Middlebury, IN (US)

(73) Assignee: GRAND DESIGN RV, LLC, Middlebury, IN (US)

( * ) Notice: Subject to any disclaimer, the term of this patent is extended or adjusted under 35 U.S.C. 154(b) by 169 days.

(21) Appl. No.: 16/050,865

(22) Filed: Jul. 31, 2018

(51) Int. Cl.
*B60P 3/36* (2006.01)
*B60P 3/34* (2006.01)
*B60R 15/02* (2006.01)

(52) U.S. Cl.
CPC .................. *B60P 3/36* (2013.01); *B60P 3/34* (2013.01); *B60R 15/02* (2013.01)

(58) Field of Classification Search
CPC ... B60P 3/34; B60P 3/36; B60R 15/02; B60R 15/00
See application file for complete search history.

(56) References Cited

U.S. PATENT DOCUMENTS

| | | | | |
|---|---|---|---|---|
| 3,289,664 A | * | 12/1966 | Hewitt | A47B 77/08 126/37 R |
| 3,627,396 A | * | 12/1971 | Miller | A47B 77/04 312/49 |
| 3,692,351 A | * | 9/1972 | Christopher | A47J 37/00 296/156 |
| 4,699,207 A | | 10/1987 | Hanemaayer | |
| 5,029,935 A | * | 7/1991 | Dufrancatel | B60P 3/36 126/276 |
| 5,662,373 A | | 9/1997 | Hanemaayer | |
| 5,862,540 A | * | 1/1999 | Chuan | B60P 3/36 4/449 |
| 5,931,151 A | | 8/1999 | Van Dore et al. | |
| 6,161,228 A | * | 12/2000 | Wietecha | A47K 1/02 4/625 |
| 6,352,088 B1 | * | 3/2002 | Stegall | B60R 15/00 137/899 |

(Continued)

OTHER PUBLICATIONS

Lippert Components; Sump Pump System OEM Installation Manual, Lippert Components, Inc., Jul. 11, 2018, 6 pages.

(Continued)

*Primary Examiner* — Jason S Morrow
(74) *Attorney, Agent, or Firm* — Faegre Drinker Biddle & Reath LLP (57) ABSTRACT

A recreational vehicle includes a body with an interior living area and an exterior storage area. The recreational vehicle also includes a kitchen assembly at least partially positioned within the exterior storage area. The kitchen assembly includes a frame coupled to the exterior storage area, a drawer slideable with respect to the frame and the body, a sink assembly positioned on the drawer and including a sink cabinet, a countertop coupled to the sink cabinet to create an interior region, a sink bowl coupled to the countertop, and a drain coupled to the sink bowl. The kitchen assembly also includes a first gray water tank in fluid communication with the drain and positioned within the interior region of the sink cabinet. A pump is positioned within the first gray water tank.

20 Claims, 10 Drawing Sheets

(56) References Cited

U.S. PATENT DOCUMENTS

| | | | |
|---|---|---|---|
| 6,637,804 B1 | 10/2003 | Crean | |
| 6,817,642 B1* | 11/2004 | Warning | B60R 15/02 |
| | | | 296/1.07 |
| 7,481,473 B1* | 1/2009 | Warning | B60R 15/02 |
| | | | 296/1.07 |
| 7,597,116 B2 | 10/2009 | Detwiler | |
| 7,604,001 B2* | 10/2009 | Craghead | F24C 15/30 |
| | | | 126/211 |
| 7,793,688 B1 | 9/2010 | Gross, Jr. et al. | |
| 7,832,780 B1* | 11/2010 | Ramseyer | F24C 15/30 |
| | | | 108/44 |
| 8,643,497 B2 | 2/2014 | Murphy | |
| 8,887,474 B1 | 11/2014 | Clark et al. | |
| 9,056,575 B2 | 6/2015 | Pham | |
| 9,403,472 B2 | 8/2016 | Kubinski | |
| 9,597,994 B1 | 3/2017 | Price | |
| 9,726,380 B2 | 8/2017 | Reischmann | |
| 2002/0189673 A1* | 12/2002 | Schoellhorn | B60R 15/00 |
| | | | 137/355.12 |
| 2003/0038504 A1* | 2/2003 | Crean | B60P 3/36 |
| | | | 296/156 |
| 2003/0192592 A1* | 10/2003 | Warning | B60R 15/02 |
| | | | 137/355.12 |
| 2003/0214150 A1* | 11/2003 | van der Vegt | B60P 3/36 |
| | | | 296/156 |
| 2005/0161974 A1 | 7/2005 | Atcravi | |
| 2005/0284417 A1 | 12/2005 | Jezl | |
| 2008/0224461 A1* | 9/2008 | Allen | B60P 3/14 |
| | | | 280/830 |
| 2011/0254304 A1 | 10/2011 | Moresco | |
| 2012/0133254 A1 | 5/2012 | Chupp et al. | |
| 2013/0127125 A1 | 5/2013 | Muller | |
| 2013/0149509 A1 | 6/2013 | Federico et al. | |
| 2016/0023217 A1* | 1/2016 | Cornille | B02C 18/0092 |
| | | | 137/2 |
| 2018/0146780 A1 | 5/2018 | Matuszewski | |
| 2018/0162259 A1 | 6/2018 | Lin | |
| 2020/0071922 A1* | 3/2020 | Calvin | B60R 15/00 |

OTHER PUBLICATIONS

Lippert Components; Sump Pump System Owner's Manual, Lippert Components, Inc., Jan. 30, 2018, 4 pages.

* cited by examiner

OUTDOOR KITCHEN

SUMMARY

In certain embodiments, a recreational vehicle includes a body with an interior living area and an exterior storage area. The recreational vehicle also includes a kitchen assembly at least partially positioned within the exterior storage area. The kitchen assembly includes a frame coupled to the exterior storage area, a drawer slideable with respect to the frame and the body, a sink assembly positioned on the drawer and including a sink cabinet, a countertop coupled to the sink cabinet to create an interior region, a sink bowl coupled to the countertop, and a drain coupled to the sink bowl. The kitchen assembly also includes a first gray water tank in fluid communication with the drain and positioned within the interior region of the sink cabinet. A pump is positioned within the first gray water tank.

In certain embodiments, a recreational vehicle includes a body with an interior living area with an interior kitchen, and the body may house a first gray water tank. The recreational vehicle also includes an exterior kitchen at a fixed position with respect to the body. The exterior kitchen includes a sink assembly with a sink cabinet, a countertop coupled to the sink cabinet to create an interior region, a sink bowl coupled to the countertop, and a drain coupled to the sink bowl. The sink assembly includes a second gray water tank positioned within the interior region of the sink cabinet and fluidly coupled between the drain and the first gray water tank. The sink assembly also includes a pump positioned within the second gray water tank and configured to pump water to the first gray water tank.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

While the disclosure is amenable to various modifications and alternative forms, specific embodiments have been shown by way of example in the drawings and are described in detail below. The intention, however, is not to limit the disclosure to the particular embodiments described but instead is intended to cover all modifications, equivalents, and alternatives falling within the scope the appended claims.

DETAILED DESCRIPTION

The present disclosure describes kitchen assemblies for outdoor use with recreational vehicles. In particular, the present disclosure describes features for delivering water to outdoor kitchen assemblies and pumping drained water to other portions of the recreational vehicle.

Figure 1:
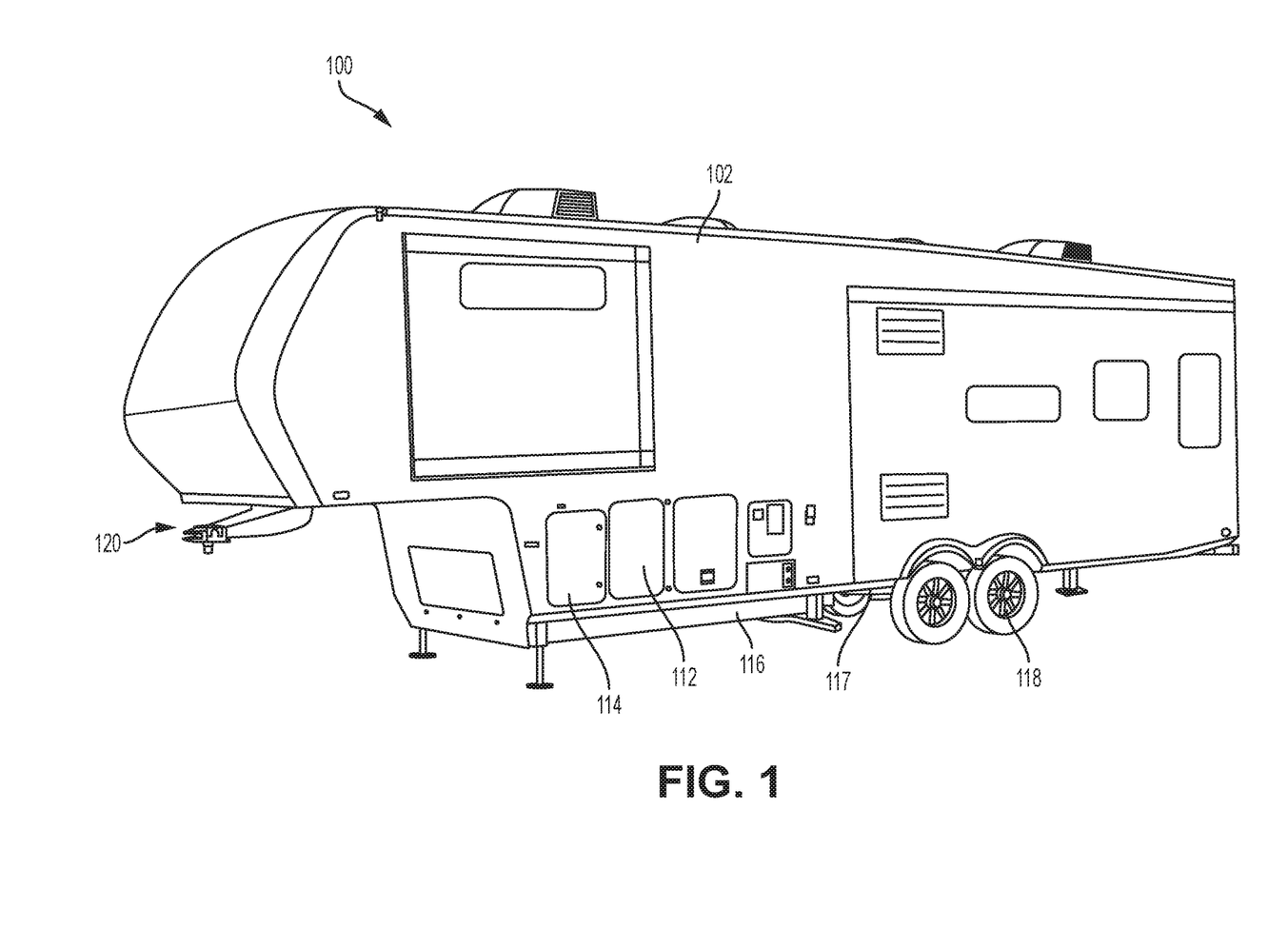
FIG. 1 shows a perspective view of a recreational vehicle, in accordance with certain embodiments of the present disclosure.
Figure 2:
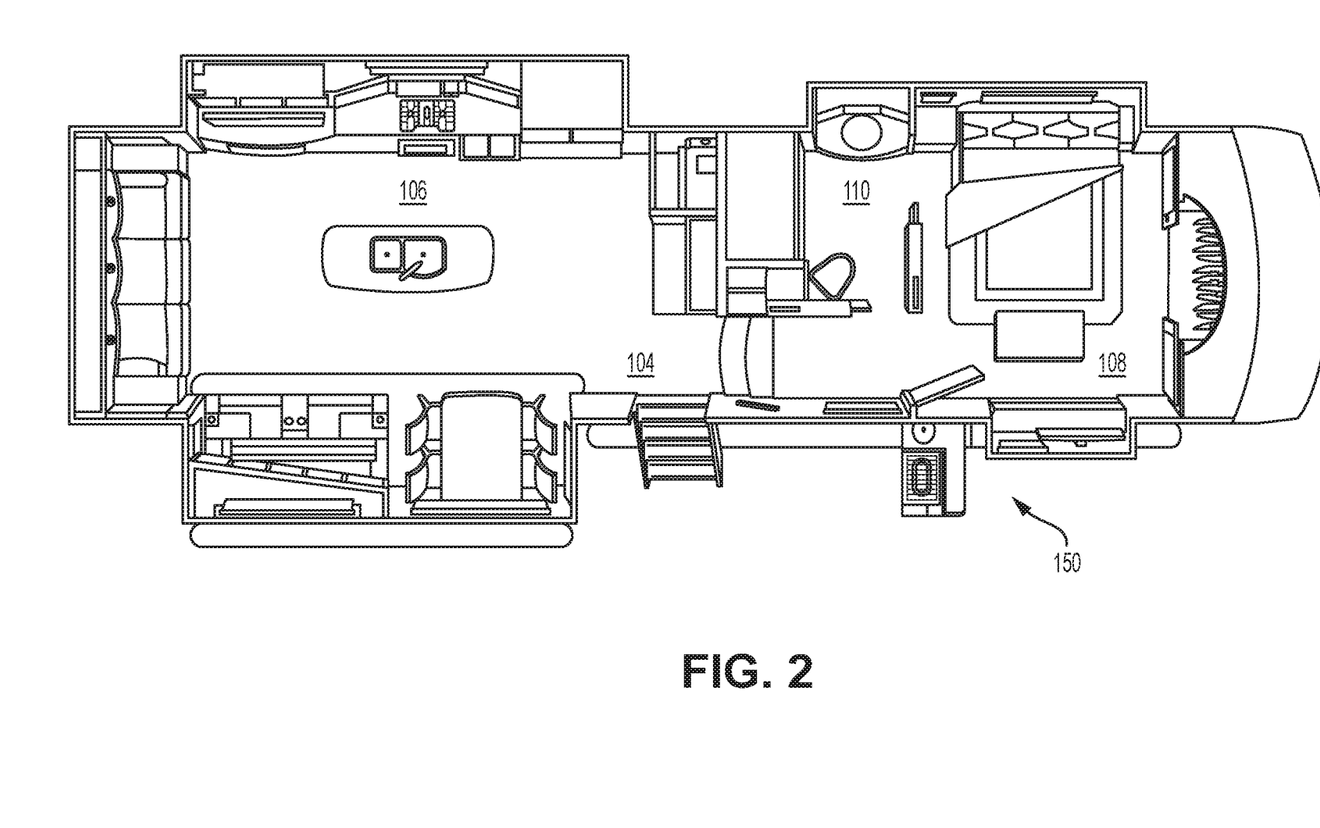
FIG. 2 shows a schematic of a floor plan of the recreational vehicle of FIG. 1, in accordance with certain embodiments of the present disclosure.

FIG. 1 shows a perspective view of a recreational vehicle 100 adapted to be towed by a vehicle and used for travel, camping, etc. FIG. 2 shows a schematic floor plan of the recreational vehicle 100. Although the recreational vehicle 100 is shown as a towable recreational vehicle, the features described below can be incorporated in, or used in connection with, a motorized recreational vehicle.

The recreational vehicle 100 includes a body 102 with an interior living area 104 (see FIG. 2) with features such as an interior kitchen 106, a bedroom 108, and a bathroom 110. The body 102 also includes exterior storage areas 112 (see FIG. 1) accessible from outside the recreational vehicle 100 by moving panels 114 (e.g., doors) to expose openings in the body 102. For example, panels may be coupled to the body 102 by hinges such that a user can swing open the panels to access the exterior storage areas 112. The body 102 is supported by a chassis 116, which is coupled to axles 117 coupled to wheels 118. The recreational vehicle 100 can include a trailer tongue 120, which is configured to be connected to the towing vehicle.

Figure 3A:
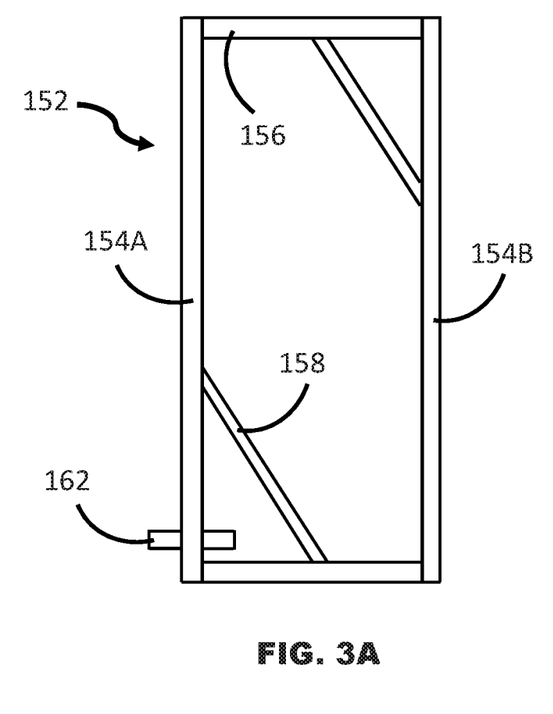
FIG. 3A shows a top view of a frame portion of a kitchen assembly, in accordance with certain embodiments of the present disclosure.
Figure 3B:
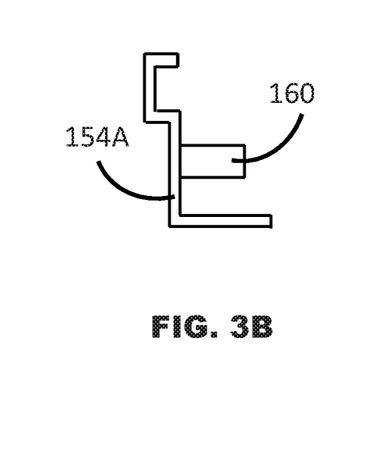
FIG. 3B shows a side view of side rail of the frame portion of FIG. 3A, in accordance with certain embodiments of the present disclosure.
Figure 4:
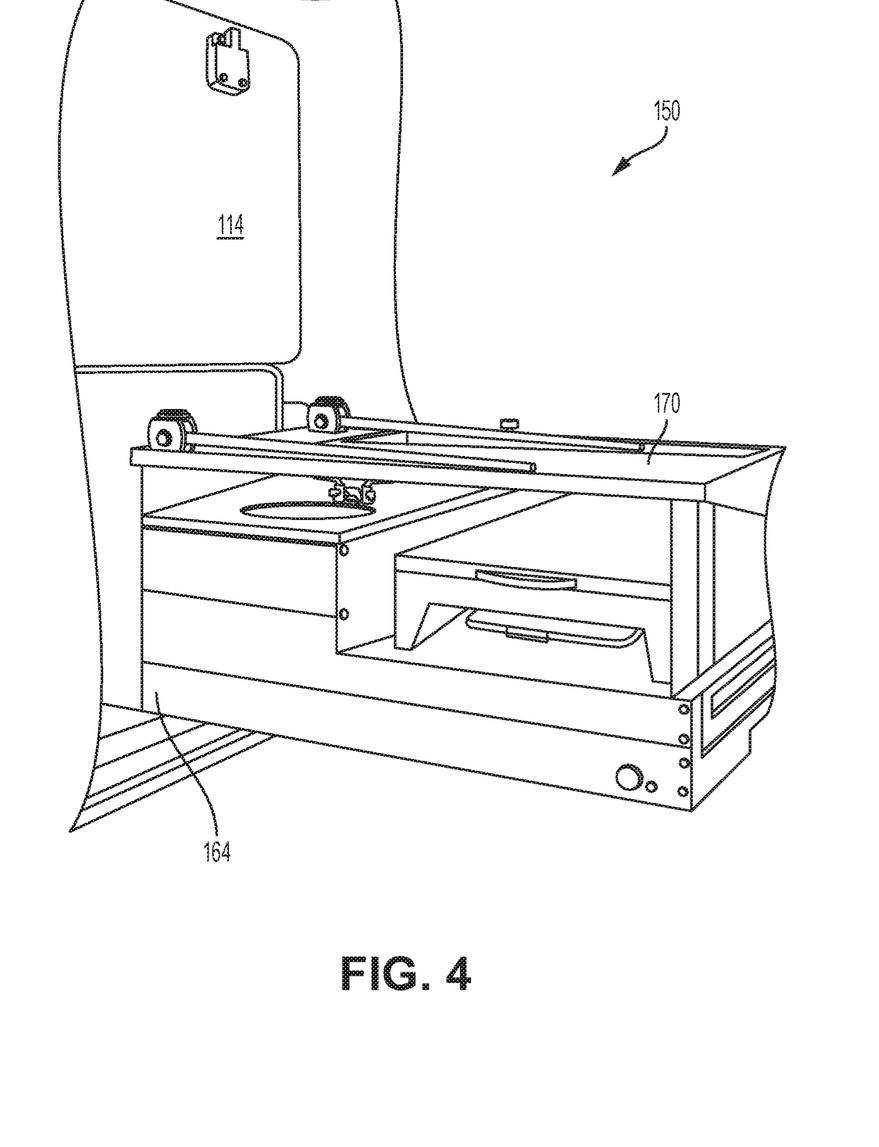
FIG. 4 shows a perspective view of a kitchen assembly in a folder, unstowed position, in accordance with certain embodiments of the present disclosure.
Figure 5:
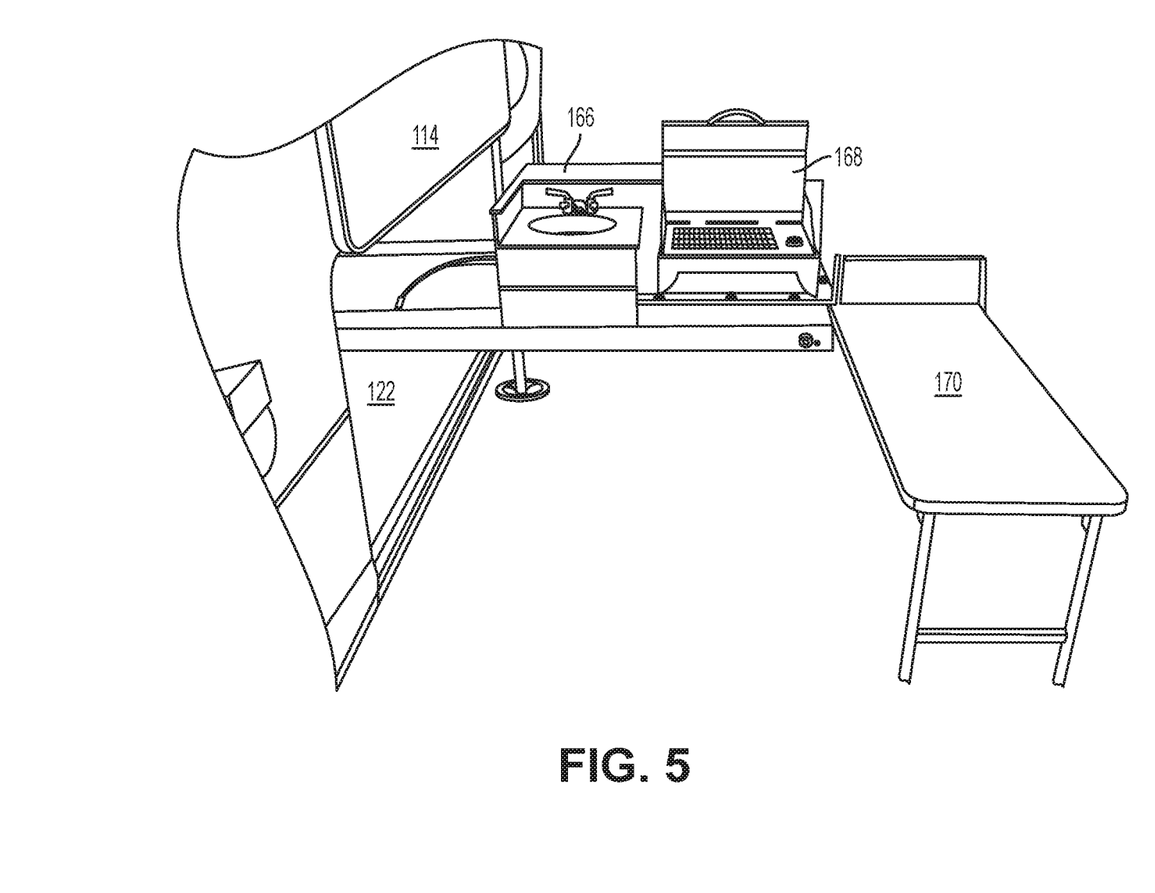
FIG. 5 shows a front view of the kitchen assembly of FIG. 4 in an unfolded, unstowed position, in accordance with certain embodiments of the present disclosure.

FIGS. 3-5 show aspects of a kitchen assembly 150 that can be moved (e.g., slid) between a stowed position, where the kitchen assembly 150 is positioned within one of the exterior storage areas 112, and an unstowed position (see FIGS. 4 and 5), where portions of the kitchen assembly 150 are positioned outside the exterior storage area 112. The kitchen assembly 150 may be referred to as an outdoor kitchen and is separate from the kitchen 106 in the interior living area 104 of the recreational vehicle 100. FIG. 1 shows an example position of the kitchen assembly 150 on the recreational vehicle 100.

FIGS. 3A and 3B show a frame portion 152 of the kitchen assembly 150 for positioning within one of the exterior storage areas 112 of the recreational vehicle 100. The frame portion 152 includes two side rails, 154A and 154B, that are coupled (e.g., directly attached) to a floor 122 (see FIG. 5) of one of the exterior storage areas 112. The side rails, 154A and 154B, are coupled together via one or more crossbars 156. The frame portion 152 may also include additional bars 158 or members coupled between the crossbars 156 and/or the side rails, 154A and 154B, to help provide structural rigidity to the frame portion 152. The frame portion 152 includes rollers 160 (one roller 160 shown in FIG. 3B) that help with enabling portions (e.g., drawer 164) of the kitchen assembly 150 to slide with respect to the frame portion 152. The frame portion 152 also includes a lock 162 that can be moved (e.g., rotated, slid) to block portions (e.g., drawer 164) of the kitchen assembly 150 from sliding from the stowed position to the unstowed position.

FIG. 4 shows the kitchen assembly 150 in an unstowed, folded position where the kitchen assembly 150 has been slid out from the exterior storage area 112 but not unfolded for use. When stowed, the kitchen assembly 150 is folded so that the kitchen assembly 150 fits into the exterior storage area 112. The kitchen assembly 150 includes a drawer 164 that slides relative to the frame portion 152 from the stowed position to the unstowed position where the drawer is cantilevered with respect to the body 102. The drawer 164 may include one or more rollers or wheels that are arranged to couple to the frame portion 152 such that the drawer 164 can slide between the stowed position and the unstowed position.

As shown in FIG. 5, the drawer 164 forms a base that supports a sink assembly 166 positioned on the drawer 164, a grill 168, and a table 170. The table 170 is arranged to unfold such that the kitchen assembly 150 is in the unfolded, unstowed position. For example, the table 170 can be coupled to various hinges that allow the table 170 to unfold into the position shown in FIG. 5. In the unfolded, unstowed position, the kitchen assembly 150 forms an L-shape with the drawer 164 extending out from the body 102 of the recreational vehicle 100 in a first direction and the table 170 extending from the drawer 164 perpendicular from the first direction.

Figure 6:
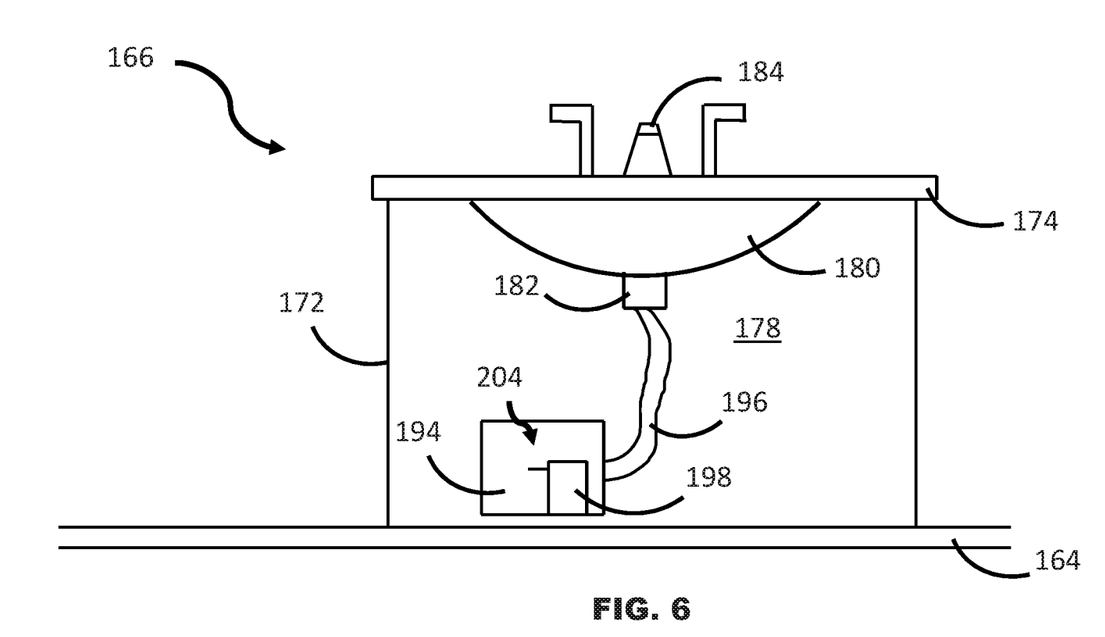
FIG. 6 shows a front view of a sink assembly, in accordance with certain embodiments of the present disclosure.

FIG. 6 shows aspects of the sink assembly 166. As shown in FIG. 6, the sink assembly 166 includes a sink cabinet 172, a countertop 174 coupled to the sink cabinet 172 to create an interior region 178 beneath the countertop 174, a sink bowl 180 coupled to the countertop 174, and a drain 182 coupled to the sink bowl 180. The sink assembly 166 also includes a sink spout 184. The sink cabinet 172 is supported by the drawer 164.

Figure 7:
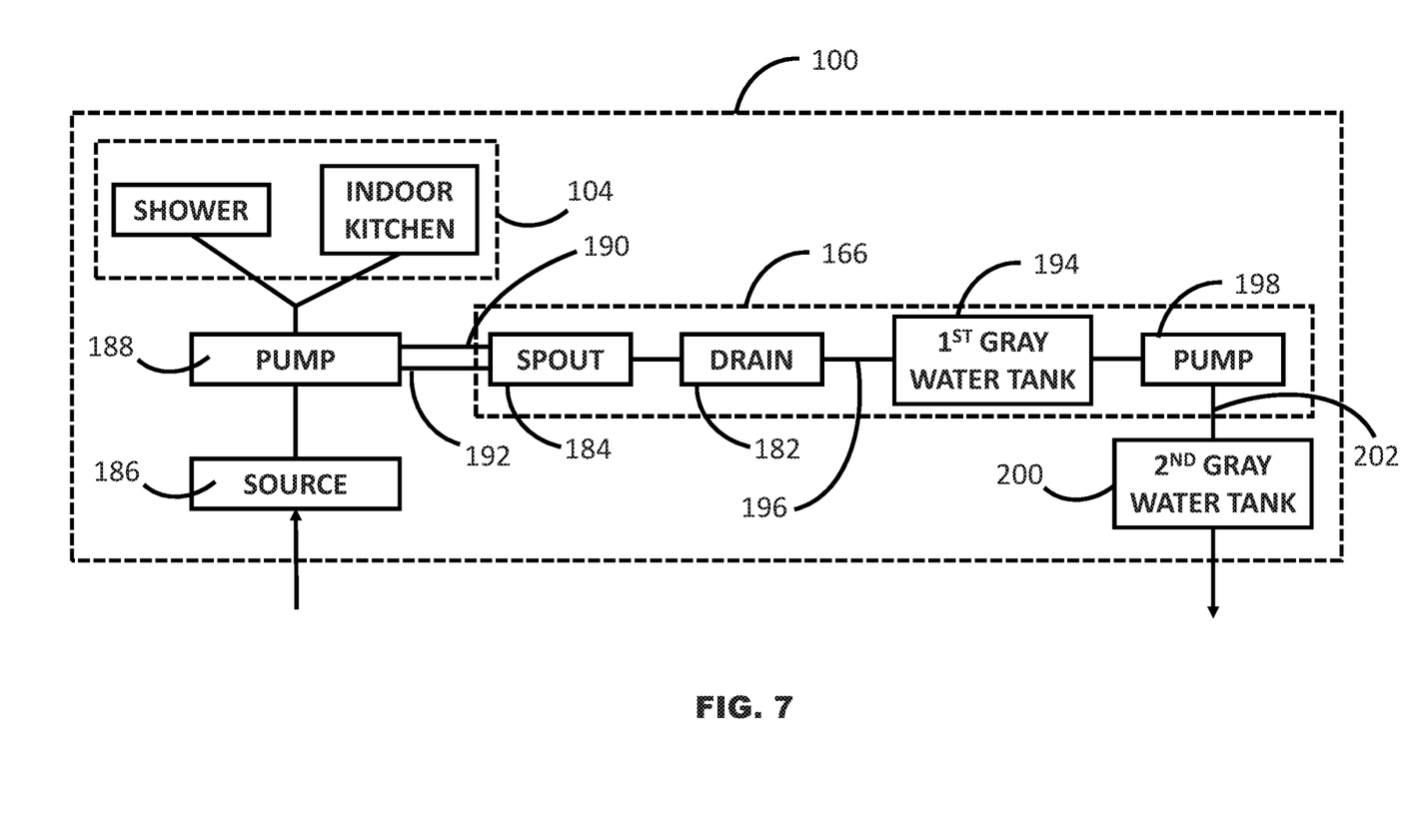
FIG. 7 shows a schematic of plumbing of the recreational vehicle of FIG. 1, in accordance with certain embodiments of the present disclosure.

FIG. 7 shows a schematic of plumping of the recreational vehicle 100 for delivering water to and from the sink assembly 166. Certain features of the recreational vehicle's plumbing system such as water heaters, etc., are omitted from FIG. 7. As shown in FIG. 7, a water source 186 (e.g., a hose connected to the recreational vehicle 100, a fresh water tank included with the recreational vehicle 100) provides water to the recreational vehicle 100. A main pump 188 pumps water from the water source 186 to the various water outlets (e.g., interior kitchen sinks, showers, toilets) in the interior living area 104 of the recreational vehicle 100 via one or more hoses (e.g., hot water hose, cold water hose). For example, the main pump 188 pumps water to the sink spout 184 through one or more hoses (e.g., a hot water hose 190 and a cold water hose 192). Although the schematic in FIG. 7 suggests that the main pump 188 has multiple outlets, the main pump 188 may only have a single outlet, which leads to one or more manifolds, hoses, lines, etc. to deliver water throughout the recreational vehicle 100.

Water from the sink spout 184 is drained from the sink bowl 180 via the drain 182. The drain 182 is fluidly connected to a first gray water tank 194, which is positioned within the interior region 178 of the sink cabinet 176. For example, a flexible tube 196 can be coupled between the drain 182 and the first gray water tank 194. A pump 198 (e.g., sump pump, bilge pump) is positioned in the first gray water tank 186. The pump 198 is fluidly coupled to a second gray water tank 200, which can be positioned in one of the exterior storage areas 112. For example, another flexible tube 202 can be coupled between the pump 198 and the second gray water tank 200. In this arrangement, the pump 198 is fluidly coupled between the first gray water tank 186 and the second gray water tank 200. As such, the pump 198 can pump water—which drains from the sink bowl 180 into the first gray water tank 186—to the second gray water tank 200.

The first gray water tank 186 (which holds the pump 198) is small enough to fit within the interior region 178 of the sink cabinet 172. The first gray water tank 186 has a holding tank volume that is less than the holding tank volume of the second gray water 200. When water from the drain 182 empties into the first gray water tank 186, the pump 198 becomes at least partially submerged in the water from the drain 182. When the level of water in the first gray water tank 186 reaches a threshold level, the pump 198 automatically turns on and begins pumping the water out of the first gray water tank 186. For example, the pump 198 can include a float 204 or another feature (e.g., sensor) that can directly or indirectly detect water levels. This automatic pumping function removes the need for a separate switch that a user must operate to initiate pumping. The pumped water exits the first gray water tank 186 to the flexible tube 202 to the second gray water tank 200. The water in the second gray water tank 200 can be disposed of by opening a valve and using another pump or gravity to move the water out of the recreational vehicle 100.

In certain embodiments, the kitchen assembly 150 could be sold as a kit. The kit may include, for example, the frame portion 152, which is to be attached to the recreational vehicle 100; the drawer 164; the sink cabinet 176; and the table 170. The kit can include the other features of the kitchen assembly 150 described above. The features of the kit can be assembled together to create the kitchen assembly 150 or subassemblies thereof.

Figure 8:
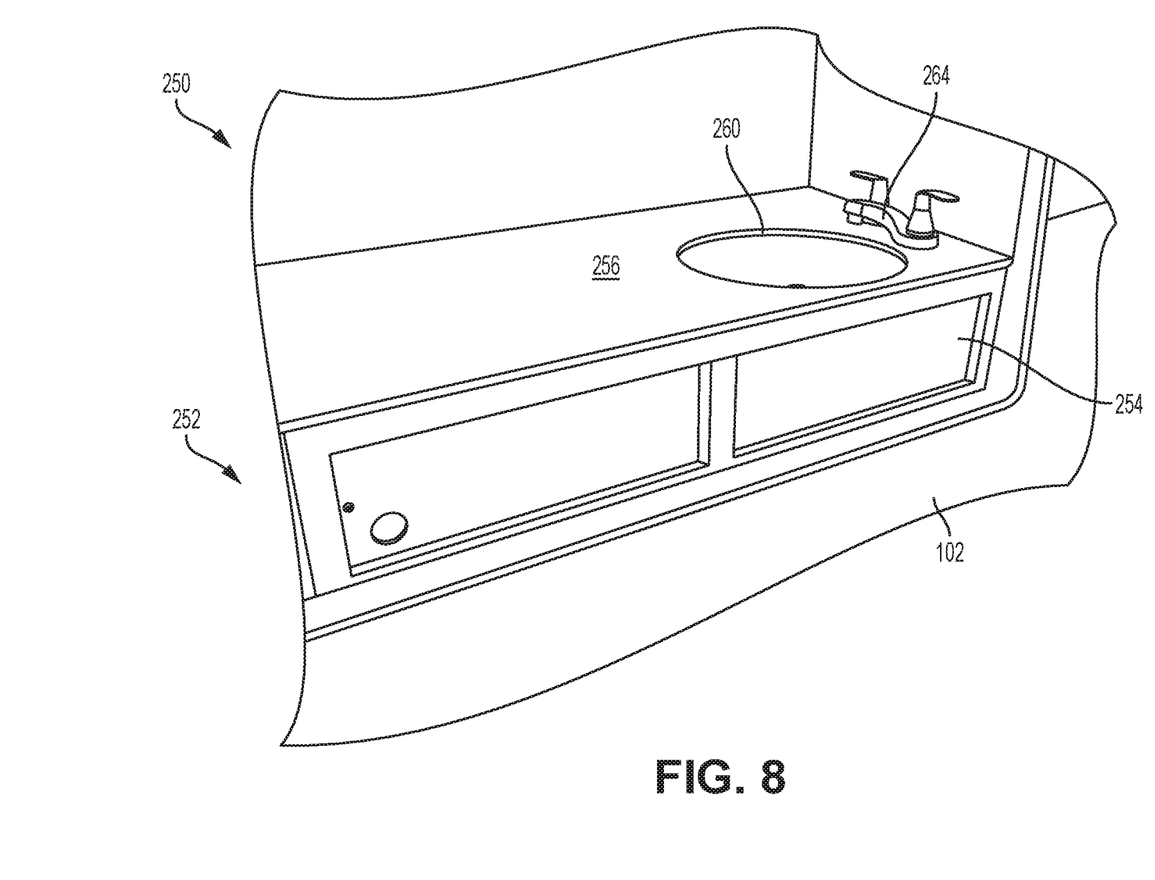
FIG. 8 shows a front view of a kitchen assembly, in accordance with certain embodiments of the present disclosure.
Figure 9:
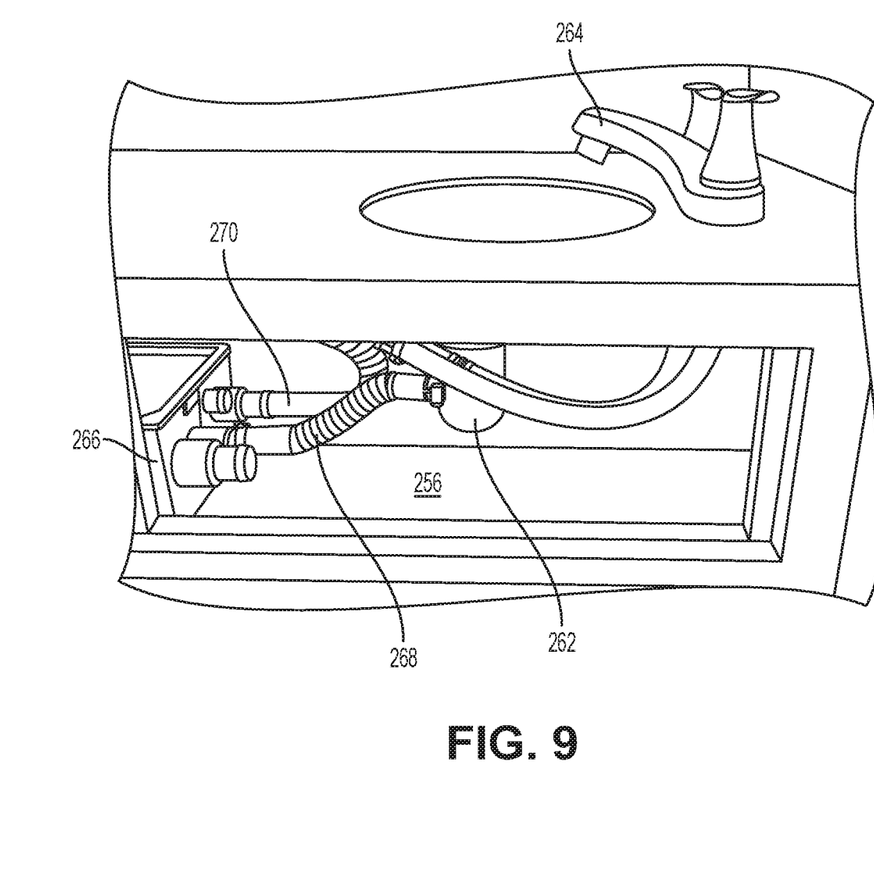
FIG. 9 shows a front view of the kitchen assembly of FIG. 8, in accordance with certain embodiments of the present disclosure.
Figure 10:
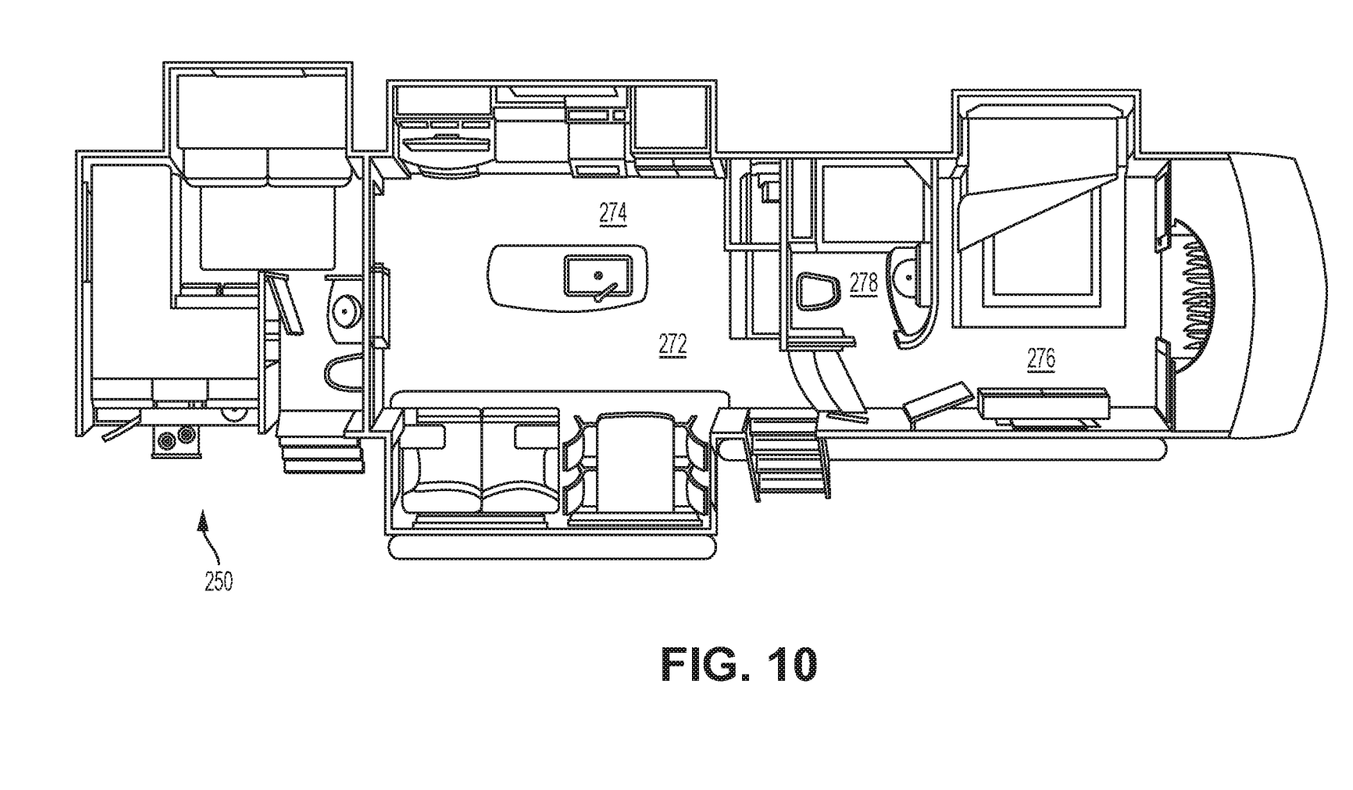
FIG. 10 shows a schematic of a floor plan of a recreational vehicle, in accordance with certain embodiments of the present disclosure.

FIGS. 8-10 show another embodiment of an outdoor kitchen, a kitchen assembly 250, which can be used with a recreational vehicle like the recreational vehicle 100 of FIG. 1. Unlike the kitchen assembly 150 described above, the kitchen assembly 250 in FIGS. 8 and 9 is fixed relative to the body 102 of a recreational vehicle 100. The kitchen assembly 250 can be covered by a body panel such as panel 114 that can be moved into and out of place.

The kitchen assembly 250 sits atop a portion of the body 102 of the recreational vehicle 100. The kitchen assembly includes a sink assembly 252, which includes a sink cabinet 254, a countertop 256 coupled to the sink cabinet 254 to create an interior region 258 (see FIG. 9) beneath the countertop 256, a sink bowl 260 coupled to the countertop 256, and a drain 262 coupled to the sink bowl 260. The sink assembly 252 also includes a sink spout 264.

Water from the sink spout 264 is drained from the sink bowl 260 via the drain 262. The drain 262 is fluidly connected to a first gray water tank 266, which is positioned within the interior region 258 of the sink cabinet 254. For example, a flexible tube 268 can be coupled between the drain 262 and the first gray water tank 266. A pump (e.g., sump pump, bilge pump) is positioned in the first gray water tank 266. The pump is fluidly coupled to a second gray water tank (such as the second gray water tank 200 in FIG. 7), which can be positioned in one of the exterior storage areas 112 of the recreational vehicle 100. For example, another flexible tube 270 can be coupled between the pump and the second gray water tank. In this arrangement, the pump is fluidly coupled between the first gray water tank 266 and the second gray water tank. As such, the pump can pump water—which drains from the sink bowl 260 into the first gray water tank 266—to the second gray water tank.

Like the gray water tank and pump assembly described above, when water from the drain 262 empties into the first gray water tank 266, the pump becomes at least partially submerged in the water. When the level of water in the first gray water tank 266 reaches a threshold level, the pump automatically turns on and begins pumping the water out of the first gray water tank to the second gray water tank.

FIG. 10 shows an alternative floorplan of a recreational vehicle which features the kitchen assembly 250. The recreational vehicle includes an interior living area 272 with features such as an interior kitchen 274, a bedroom 276, and a bathroom 278. FIG. 10 shows the position of the kitchen assembly 250 on the recreational vehicle.

Various modifications and additions can be made to the embodiments disclosed without departing from the scope of this disclosure. For example, while the embodiments described above refer to particular features, the scope of this disclosure also includes embodiments having different combinations of features and embodiments that do not include all of the described features. Accordingly, the scope of the present disclosure is intended to include all such alternatives, modifications, and variations as falling within the scope of the claims, together with all equivalents thereof.

We claim:

1. A recreational vehicle comprising:
   a body including an interior living area and an exterior storage area; and
   a kitchen assembly at least partially positioned within the exterior storage area, the kitchen assembly including:
   a frame coupled to the exterior storage area,
   a drawer slideable with respect to the frame and the body,
   a sink assembly positioned on the drawer and including a sink cabinet, a countertop coupled to the sink cabinet to create an interior region, a sink bowl coupled to the countertop, and a drain coupled to the sink bowl,
   a first gray water tank in fluid communication with the drain and positioned within the interior region of the sink cabinet, and
   a pump positioned within the first gray water tank.

2. The recreational vehicle of claim 1, wherein the first gray water tank is fluidly coupled to the drain via a flexible hose.

3. The recreation vehicle of claim 1, further comprising:
   a second gray water tank fluidly coupled to the pump, wherein the pump is configured to pump water drained from the sink bowl to the second gray water tank.

4. The recreational vehicle of claim 3, wherein the second gray water tank is fluidly coupled to the pump via a flexible hose.

5. The recreational vehicle of claim 3, wherein the second gray water tank is positioned within the exterior storage area.

6. The recreational vehicle of claim 3, wherein the second gray water tank has a larger tank volume than the first gray water tank.

7. The recreational vehicle of claim 1, wherein the pump is fluidly coupled between the first gray water tank and the second gray water tank.

8. The recreational vehicle of claim 1, wherein the pump is configured to be at least partially submerged in water when the first gray water tank fills up with water.

9. The recreational vehicle of claim 1, wherein the pump is a sump pump or a bilge pump.

10. The recreational vehicle of claim 1, wherein the pump is configured to begin pumping water from the first gray water tank upon water in the first gray water tank reaching a threshold water level.

11. The recreational vehicle of claim 10, wherein the threshold water level is detected by a float.

12. The recreation vehicle of claim 1, wherein the sink assembly further includes a sink spout, the recreational vehicle further comprising:
   a main pump fluidly coupled to the sink spout to a water source.

13. The recreation vehicle of claim 1, wherein the drawer is slidable between a stowed position and an unstowed position.

14. The recreational vehicle of claim 1, wherein the kitchen assembly further includes a folding table.

15. The recreation vehicle of claim 1, wherein the entire kitchen assembly is positioned in the exterior storage area in a stowed position, and wherein only a portion of the kitchen assembly is positioned in the exterior storage area in an unstowed position.

16. The recreation vehicle of claim 1, wherein the drawer is cantilevered in the unstowed position.

17. The recreation vehicle of claim 1, wherein the kitchen assembly further includes a grill assembly positioned on the drawer.

18. A recreational vehicle comprising:
   a body with an interior living area with an interior kitchen, the body housing a first gray water tank;
   an exterior kitchen at a fixed position with respect to the body, the exterior kitchen including:
   a sink assembly with a sink cabinet, a countertop coupled to the sink cabinet to create an interior region, a sink bowl coupled to the countertop, and a drain coupled to the sink bowl,
   a second gray water tank positioned within the interior region of the sink cabinet and fluidly coupled between the drain and the first gray water tank, and
   a pump positioned within the second gray water tank and configured to pump water to the first gray water tank.

19. The recreation vehicle of claim 18, further comprising:
   a body panel that is coupled to the body to cover the exterior kitchen.

20. The recreational vehicle of claim 18, wherein the pump is a sump pump or a bilge pump.

* * * * *